United States Patent [19]
Säberg

[11] 3,821,892
[45] July 2, 1974

[54] APPARATUS FOR TENSILE TESTING
[76] Inventor: Ove Säberg, 14, Odensegade, Copenhagen, Denmark
[22] Filed: July 21, 1972
[21] Appl. No.: 273,966

[30] Foreign Application Priority Data
July 21, 1971   Denmark............................ 3576/71

[52] U.S. Cl.................... 73/88 B, 73/97, 73/150 A
[51] Int. Cl............................................ G01n 19/04
[58] Field of Search........... 73/88 B, 150 A, 95, 97, 73/103

[56] References Cited
UNITED STATES PATENTS
| | | | |
|---|---|---|---|
| 2,113,725 | 4/1938 | Goldman | 73/150 A |
| 3,269,176 | 8/1966 | Egitto et al. | 73/150 A |
| 3,577,775 | 5/1971 | Henderson | 73/150 A X |
| 3,595,072 | 7/1971 | Richards | 73/95 X |

Primary Examiner—Charles A. Ruehl
Attorney, Agent, or Firm—Wenderoth, Lind & Ponack

[57] ABSTRACT

An apparatus for tensile testing, particularly for testing the adhesion of coatings of, e.g., paint, for testing adhesives, and for testing the cohesion of material, includes a pulling member for tearing off a test member adhesively secured to the test object, and a pressure rod with means for moving the rod relative to the pulling member, the pressure rod being pivotably connected to a yoke with two legs straddling the test member and resting on the surface of the test object on a line through the center of the test member when the apparatus is in use.

4 Claims, 2 Drawing Figures

APPARATUS FOR TENSILE TESTING

BACKGROUND OF THE INVENTION

This invention relates to an apparatus for tensile testing, particularly for testing the adhesion of coatings to surfaces such as coatings of paint, for testing adhesives, and for testing the cohesion of materials, by pulling off a test piece, called a dolly member, which has been adhesively secured to the test object. The apparatus is of the kind comprising a pulling member designed to enclose the head of the dolly member and to apply a tractive force to the latter when a pressure rod being displaceable relative to the pulling member is made to exert a pressure against the surface of the test object.

When using such devices, it is essential that the tests are carried out at well defined and reproducible conditions. Also, the apparatus should be easily transportable to allow using it in laboratories and in field work, and manual operations in its use should be reduced to a minimum.

In known devices of this kind, the tractive force exerted upon the pulling member is created by means of a spindle being rotated in a three-legged support threading upon the surface of the test object. It is often hard work to use these devices, since the tractive force may amount to several hundred kilograms per square centimeter, and in their use exists a great risk of exerting a lateral or displacement pressure in addition to the perpendicular force to be applied, in which case the test conditions are no longer well defined. A displacement force is easily created when the turning of the handwheel calls for great forces, but also if for some reason the three-legged support rests in a tilted position.

SUMMARY OF THE INVENTION

The object of the invention is to provide an apparatus of the above type which is easy and quick to use and which ensures that tractive force is exerted perpendicular to the test area notwithstanding possible irregularities in the vicinity of the test area.

This object is attained, according to the invention, by the pressure rod of the apparatus being pivotably connected to a yoke having the shape of an inverted U, the two legs of which rest upon the surface of the test object, one on each side of the adhesively fixed dolly member, on a line through the center of the latter when the apparatus is in use.

In this manner, almost complete assurance against unintentional application of a lateral force is attained, since a two-legged support being pivotably connected to the pressure rod may also rest upon an uneven surface without making the pressure rod tilt, which may be very difficult to attain with a three-legged support.

The results of an extended series of tests with the present apparatus have indeed resulted in less scattering of the test results than experienced with the best of the devices hitherto used in practice.

To guard against faulty operation by applying an oblique tractive force to the dolly members, the pulling member according to the invention has a socket with a slot, the width of which is substantially equal to the diameter of the neck of the dolly member, and the depth of which is such that the dolly member is centered in the socket when its neck has reached the bottom of the slot, whereas a fixing cap with a corresponding slot is screwed onto the socket to secure and clamp the head of the dolly member in the centered position.

That the tractive forces are always acting perpendicular to the surface of the test object can be further ensured, according to the invention, when a pressurized gas in a manner known per se is used for creating the tractive force by attaching the pulling member to a pressure box consisting of an upper part, which can be connected to a source of pressurized gas, and a lower part, between which two parts is mounted a resilient diaphragm resting upon a disc in the lower part of the pressure box, such disc being attached to the pressure rod of the apparatus, the rod passing through an opening in the lower part of the pressure box.

It is further expedient, according to the invention, to have a helical spring enclosing the part of the pressure rod which is outside the pressure box, such helical spring extending between the lower part of the pressure box and a shoulder on the pressure rod.

On one hand, this results in subduing and braking the blowlike movement of the disc in the pressure box and the parts connected thereto, when the dolly member is suddenly torn off, and on the other hand, the helical spring aids in keeping the apparatus in a fixed position while the fixing cap is tightened upon the socket.

BRIEF DESCRIPTION OF THE DRAWING

The accompanying drawings show an embodiment of the present apparatus.

DETAILED DESCRIPTION OF THE INVENTION

Figure 1:
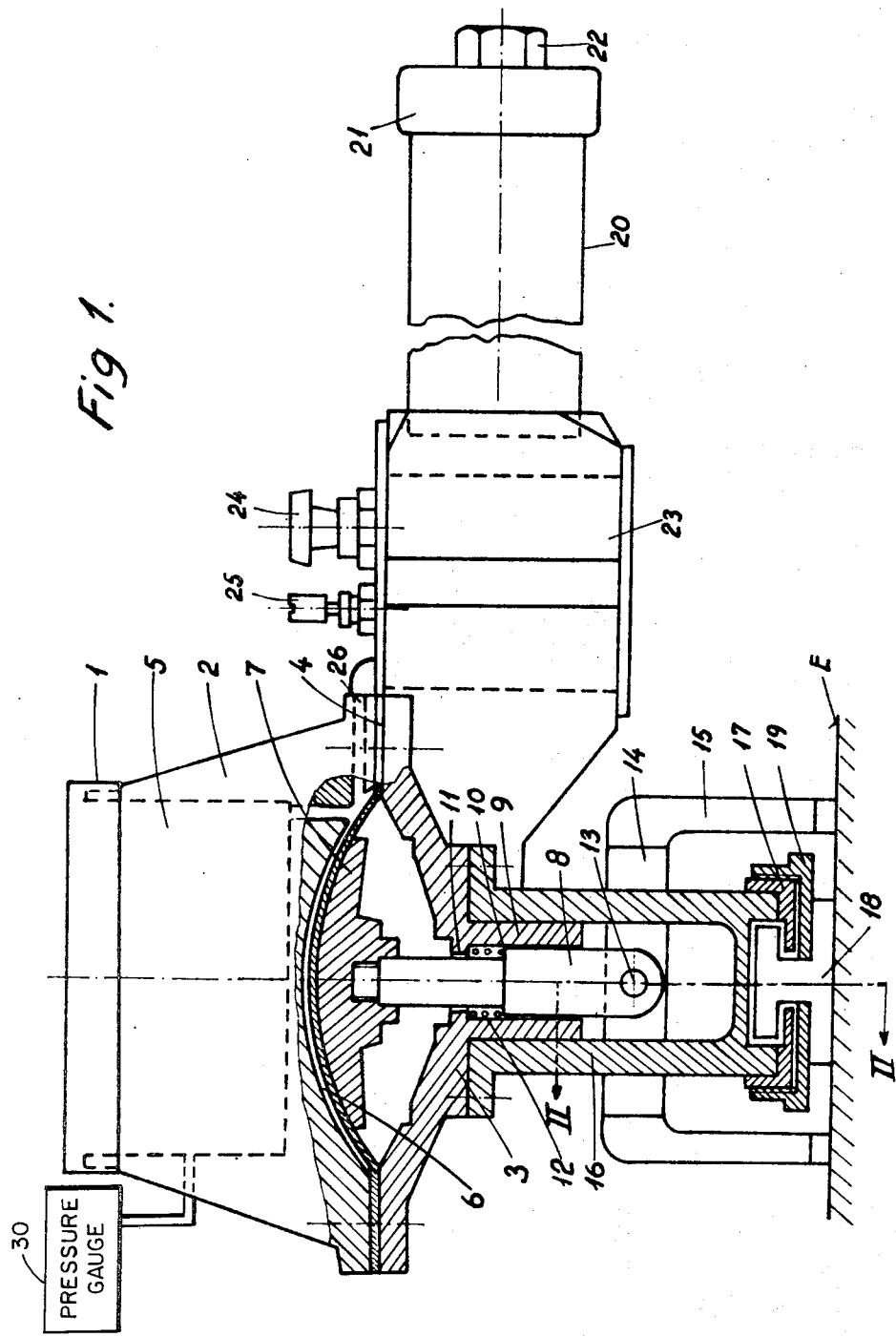
FIG. 1 being a side elevation partly in section.
Figure 2:
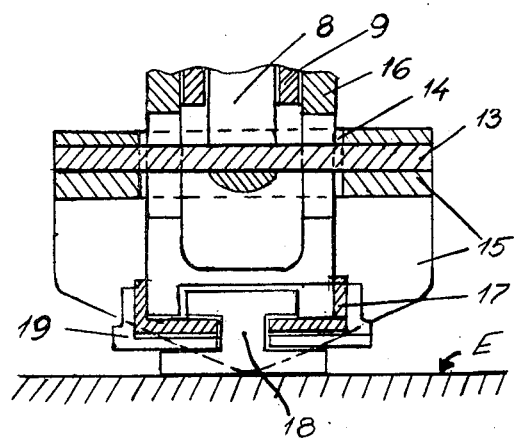
FIG. 2 a section on line II—II of FIG. 1.

A pressure box 1 in two pieces consists of an upper part 2 and a lower part 3, between which is fixed an upwardly arched rubber diaphragm 4.

The upper part 2 has a cavity 5, to which a pressure gauge 30 can be connected, and its lower surface is vaulted following the top side of the rubber diaphragm 4, leaving a narrow space 6 therebetween.

A thrust plate 7 rests against the bottom side of the diaphragm 4. The thrust plate is carried by a pressure rod 8 being movable in a sleeve 9 forming an extension of the lower part of the pressure box 3. The part of the pressure rod closer to the thrust plate 7 has a reduced diameter, as compared with the rest of the rod, to form a shoulder 10 within the sleeve 9. Further, the sleeve 9 has an internal collar 11 fitting around the thinner part of the pressure rod. Extending between collar 11 and the shoulder 10 on the pressure rod, a helical spring 12 encloses the thinner part of the pressure rod.

A pivot 13 penetrating the lower end of the pressure rod 8 is fixed diametrically in an opening 14 in a yoke 15 having the shape of an inverted U when seen in elevation, the two downward tapering legs of the yoke being intended for supporting the apparatus when resting upon the surface E of the test object.

A pulling member 16 of H-shaped section is fixed upon the lower part 3 of the pressure box, enclosing and being attached also to the outer surface of the sleeve 9. The pulling member 16 extends down through the opening 14 in the yoke 15, the cross bar of the H being placed well under the pivot 13 in order not to form a stop for the latter, when the pressure rod 8 moves relative to the pulling member 16.

A socket 17, consisting of a cylinder closed at its bottom with a circular disc, is fixed to the bottom part of the pulling member 16. The socket 17 is intended to engage a dolly member 18 which has been glued to the surface E of the test object. The dolly member consists of a circular metal disc with a plane bottom side and having a head with a short neck on the top side. In order that the socket 17 may engage and exert a tractive force upon the dolly member 18, the circular disc of the socket 17 is provided with a radially extending slot, the width and depth of which are so designed that the neck of the dolly member 18 is centered in the pulling member when inserted as far as possible into the slot.

The outer surface of the cylindrical part of the socket 17 is threaded for screwing on a fixing cap 19 having a slot corresponding to that of the socket 17.

A tubular handle 20 is fastened to the bottom part 3 of the pressure box 1, the free end of the handle being closed by a cap 21 having a coupling member 22 for a (not shown) hose for supplying pressurized gas.

Between the handle 20 and the bottom part 3 of the pressure box is inserted a valve chamber 23 with a built-in pressurized gas valve, which can be opened and closed by means of a push button 24. Alternatively, two push buttons can be placed side by side, one for opening and the other for closing the gas valve.

The valve chamber further encloses a throttle for adjusting the supplied gas volume, such throttle being adjusted by means of a slotted screw 25.

A passage 26 connects the valve chamber 23 with the cavity 5 and space 6.

The apparatus is used in the following manner:

A pressurized gas hose is coupled to the apparatus at 22, the pressurized gas passing through the tubular handle 20 to reach the valve chamber 23. By means of the throttle, the increase of tractive force per unit of time is adjusted to a fixed value, e.g., 5 kp/sec.

The testing, for example intended to determine the adhesion of a coating of paint, is carried out by means of a series of dolly members, the bottom sides of which have been cleaned and ground off, and which equally spaced have been glued to the painted surface by means of a strong adhesive. Generally dolly members are used, having a contact area of 1, 3, or 6 cm², the smaller ones being used when the adhesion is supposed to be large.

Generally, the adhesive is allowed to cure for 48 hours before the testing is carried out. Starting by turning the fixing cap 19 of the apparatus until its slot coincides with that of the socket 17, the latter is then brought to engage the head of a dolly member glued to the test object, after which the fixing cap 19 is turned to center the apparatus relative to the dolly member so that the legs of the yoke 15 come to rest against the surface E of the test object on a line through the center of the adhesively fastened area of the dolly member. The fixing cap 19 is then screwed further on to the socket 17 until the head of the dolly member is secured in the socket 17, and it is ascertained that the axis of the pressure rod 8 lies in continuation of the symmetrical axis of the dolly member.

Then, pressurized gas is admitted by operating the push button 24, whereby the gass passes through the channel 26 to the mutually connected cavity 5 and space 6, the increase in pressure being observed on a pressure gauge connected to the cavity 5.

The rubber diaphragm 4 transmits the gas pressure to the thrust plate 7, thereby pressing the yoke 15 against the surface E, the pressure box 1 being influenced by a corresponding force attempting to drive the pressure box with the attached pulling member 16 in the opposite direction.

When the gas pressure has become sufficiently large, the dolly member is suddenly torn away, and the pulling member with the dolly member rises relative to the yoke 15, resulting in the thrust plate 7 and with it the rubber diaphragm 4 moving away from the upper part 3 of the pressure box to increase the space 6 with the result that the pressure in the cavity decreases. Thus, the maximum showing of the pressure gauge corresponds to the force necessary to tear off the dolly member. The bottom side of the latter is then examined to ascertain where the rupture has taken place, which could be either in the layer of paint, in the interphase between paint and test surface, or in the material of the test object. In the first and third cases, the adhesion is, of course, perfectly satisfying, while in the second case it depends on the tractive force applied for tearing off the dolly member whether the adhesion can be considered satisfactory.

When the dolly member has been torn away, the gas supply is cut off, and the fixing cap 19 is turned until the dolly member can be removed. The helical spring 12 will then make the thrust plate 7 return to the starting position, and the apparatus is ready for the next test.

What is claimed is:

1. In an apparatus for testing the tensile force required to pull off a test member adhesively fastened to a test object, particularly for testing the adhesion of coatings to surfaces, for testing adhesives, and for testing the cohesion of materials, said apparatus including a pulling member attachable to said test member, a pressure rod, means to move said pressure rod relative to said pulling member to cause said test member to be pulled from said test object, and means for determining the force required to pull said test member from said test object, the improvement comprising:
   a yoke in the form of an inverted U and having two downwardly extending legs, said legs when in use adapted to straddle said test member and contact said test object at points on a straight line through the center of said test member; and
   said pressure rod being pivotally connected at a first end thereof to said yoke.

2. The improvement claimed in claim 1, wherein said test member has a gripping head attached thereto by a neck portion; and said pulling member has a socket for gripping attachment to said gripping head, said socket having a radial slot therein, said slot having a width to fit said neck portion and a depth such that said test member is centered in said apparatus when said neck portion is inserted to the bottom of said slot; and further comprising a cap means having therein a slot with width and depth dimensions corresponding to those of said slot to said socket; said cap means being rigidly attachable to said socket of said pulling member for fixing said test member with respect to said socket.

3. The improvement claimed in claim 1, wherein said means to move comprises a pressure box having an upper part with means for connection to a source of pressurized gas, and a lower part attached to said pulling member, a second end of said pressure rod passing through said lower part into a space between said upper and lower parts; a thrust plate connected to said second end of said pressure rod and positioned in said space; and a resilient diaphragm clamped between said upper and lower parts and resting on said thrust plate.

4. The improvement claimed in claim 3, wherein said pressure rod below said lower part has a shoulder; and further comprising a helical spring surrounding said pressure rod between said lower part and said shoulder.

* * * * *